(12) United States Patent
Freund

(10) Patent No.: US 12,472,724 B2
(45) Date of Patent: *Nov. 18, 2025

(54) HIGH RESOLUTION ELASTOMERIC EXTERIOR LAMINATE MATERIAL AND METHOD OF FORMING SAME

(71) Applicant: Robert Freund, Wilmington, NC (US)

(72) Inventor: Robert Freund, Wilmington, NC (US)

(73) Assignee: Macaw Technologies, LLC, Parkland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,485

(22) Filed: Aug. 1, 2024

(65) Prior Publication Data

US 2024/0416619 A1    Dec. 19, 2024

Related U.S. Application Data

(63) Continuation-in-part of application No. 18/333,849, filed on Jun. 13, 2023, now Pat. No. 12,103,274, which is a continuation-in-part of application No. 17/473,900, filed on Sep. 13, 2021, now abandoned.

(60) Provisional application No. 63/078,264, filed on Sep. 14, 2020.

(51) Int. Cl.
| | |
|---|---|
| B32B 25/10 | (2006.01) |
| B32B 3/30 | (2006.01) |
| B32B 5/02 | (2006.01) |
| B32B 9/04 | (2006.01) |
| B32B 25/16 | (2006.01) |
| B32B 27/12 | (2006.01) |

(52) U.S. Cl.
CPC .............. *B32B 9/045* (2013.01); *B32B 5/022* (2013.01); *B32B 5/024* (2013.01); *B32B 5/026* (2013.01); *B32B 2250/03* (2013.01); *B32B 2260/046* (2013.01); *B32B 2307/412* (2013.01); *B32B 2307/538* (2013.01); *B32B 2307/7376* (2023.05); *B32B 2317/10* (2013.01)

(58) Field of Classification Search
CPC .......... B32B 25/16; B32B 25/10; B32B 3/30; B32B 5/02; B32B 5/022; B32B 5/024; B32B 5/026; B32B 9/045; B32B 27/12; B32B 2307/744; B32B 2307/412
See application file for complete search history.

(56) References Cited

U.S. PATENT DOCUMENTS 9,556,554 B2 *   1/2017   Lyons .................... B82Y 30/00

* cited by examiner

*Primary Examiner* — Joanna Pleszczynska
(74) *Attorney, Agent, or Firm* — R. William Graham

(57) ABSTRACT

An elastomeric laminate material having resolution and image clarity includes an underlying ink graphic fabric material which is receptive to a elastomer-based material, the underlying ink graphic fabric material layer having an image thereon having interstitial areas residing in the underlying ink graphic fabric material layer and elastomer-based transparent material is formed as a layer thereon penetrating the interstitial areas in a manner to substantially remove all air therefrom and which is compressed and consolidated bonded to the ink graphic layer to form a substantially uniform laminate configuration and retain a transparent and elastic cushion characteristic through the exterior polymeric film layer enabling resolution and clarity of the image, wherein the exterior polymeric film layer imparts a nonslip tactile surface to the laminate.

18 Claims, 23 Drawing Sheets

FIG. 22
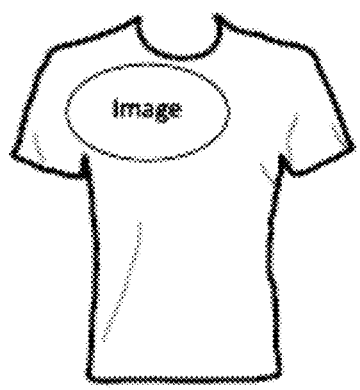
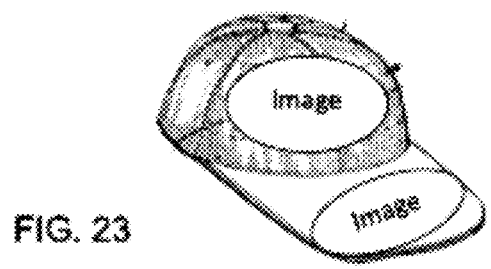
FIG. 23
FIG. 24
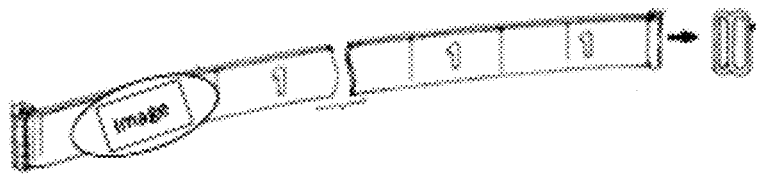

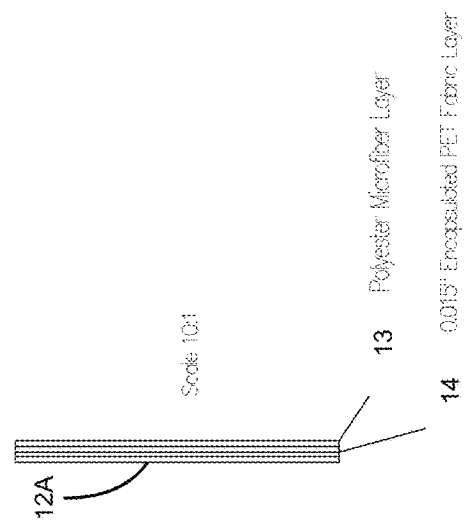
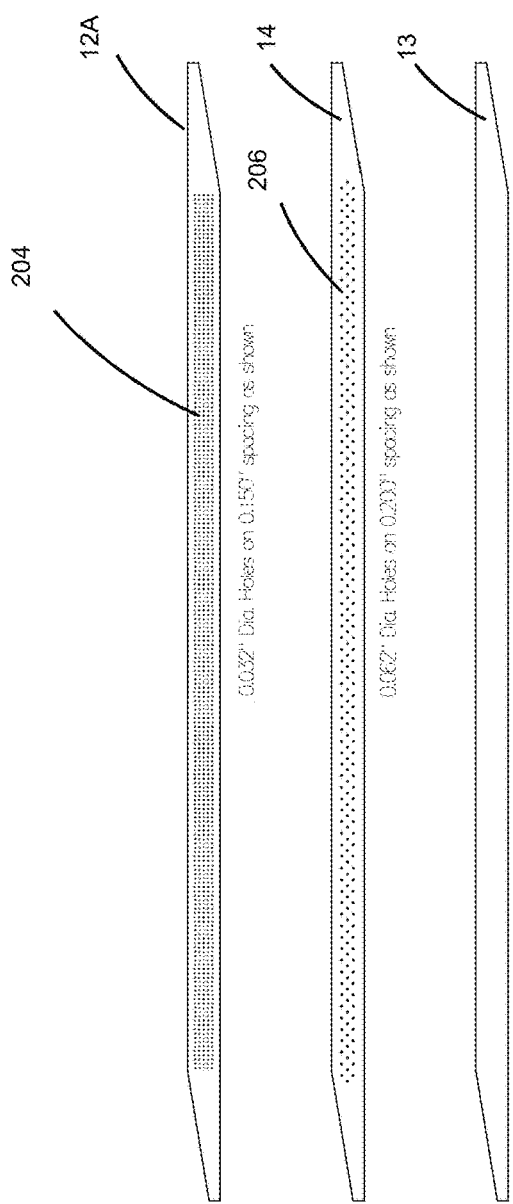

HIGH RESOLUTION ELASTOMERIC EXTERIOR LAMINATE MATERIAL AND METHOD OF FORMING SAME

This application claims the benefit of earlier filed U.S. application Ser. No. 18/333,849 filed Jun. 13, 2023 and U.S. application Ser. No. 17/473,900 filed Sep. 13, 2021 which claims the benefit of provisional U.S. 63/078,264 filed Sep. 14, 2020.

BACKGROUND OF THE INVENTION

1. Field of the Invention

In general, the present invention relates to applying a textured transparent film to a printed high resolution image on a fabric or film, which can be formed onto the exterior of a product. More particularly, the present invention relates to applying technology of the instant invention to provide vivid imagery or graphics with high tactile feel and/or high friction onto a surface, such as a grip, molded part surface, i.e., handles and other gripping surfaces.

2. Prior Art Description

U.S. Pat. Nos. 6,544,634; 7,166,249; 7,927,688; and U.S. Pat. No. 8,062,737 to Abrams and Freund disclose printing high resolution images on microporous film, coating such film, and adhering the coated film to a polymer or elastomeric substrate by various methods including sheet extrusion, injection molding, blow molding, and compression molding. Such coatings used for the printed film are for functional means such as protection of the printed ink and any built in security features. An alternative functional purpose is use of the coating to increase the friction between the label and mold cavity surface, helping to maintain the position of the label during the injection molding process. While such prior coatings had some advantages, they were limited in functionality and there is a need to provide a new coating to not only achieve greater functionality but also maintain clarity of an underlying image.

Direct printing patents on fabrics: CN100354134C, U.S. Pat. Nos. 5,853,861A, 6,341,856B1 describe direct printing on a textile fabric. Transfer printing on fabrics: EP0581614B1 describes transfer dye sublimation printing. U.S. Pat. No. 4,086,112A to Porter and U.S. Pat. No. 5,643,387A to Berghauser and U.S. Pat. No. 5,488,907 to Sawgrass describe a transfer printing process where ink is printed on a paper media. The ink is transferred to a fabric and thermally bonded upon applying heat and pressure. Printing on a fabric has advantages over a film. The fabric may offer greater strength, higher elasticity, and anisotropic properties where the fabric may stretch differently in different directions. Australian Patent Application No. AU2016225922A describes dye sublimation printing on a fabric that is deformed to create a tactile, textured feel.

Methods of fusing a printed film to a polymeric or elastomeric substrate are known. Applying a printed, microporous film to a molded product is known. Current technology typically uses silicone based materials to repel water and or natural wax materials and are bonded with a platinum catalyst based adhesive and are expensive. Some of the prior art uses nylon and vinyl fabric for printing and then bond a coating with an adhesive. The prior art bonded using primers have average adhesion to the surface and results in low wear time and degrade in the usage application. Silicone is difficult to bond but designed to generate the surface tension that the market wants and desires. Unfortunately, such products are costly and are inert for bonding and are not soluble with most adhesives. They typically use a Platinum primer as bonded agent to initiate some bond sites. There is a need to improve the materials and methods of forming coatings and films and textures which include printed indicia in connection therewith. Methods to form a printed fabric to an elastomeric substrate may vary. The printed fabric may be co-molded with the substrate or formed to the exterior of the substrate in a secondary operation following molding. This need is met by the present invention as described and claimed below.

SUMMARY OF THE INVENTION

An object of the present invention is to provide a high friction, high performance exterior surface of a gripping element that has high resolution images below the transparent, textured film.

Another object of the invention is to provide a grip technology that offers high performance traction, comfort and feel combined with vivid imagery and graphics.

Still another object is to provide a method of making laminate having a textured exterior surface.

Another object of the present invention is laminating an elastomeric material to the interior surface of the laminate. This interior surface may be textured or have relief designed in to provide desired cushioning that is independent of the exterior texture.

Yet another object of the invention is to provide a more durable laminate foam substrate which requires less foam density yet provides enhanced comfort and surface tension.

Accordingly, the invention is directed to high resolution elastomeric exterior laminate material which includes an exterior polymeric film, and an ink graphic layer bonded to the exterior polymeric film. The instant invention provides a carrier that can be a film or fabric wherein print is applied on film or fabric. An elastomeric exterior material can include a texture is applied to the printed film or fabric. The exterior polymeric film may be a thermoplastic elastomer, a thermoset and may be hydrophobic. In a preferred embodiment, there is provided an elastomeric exterior laminate material having resolution and image clarity, which includes an underlying ink graphic fabric material which is receptive to a SEBS like material, the underlying ink graphic fabric material layer having an image thereon having a first predetermined width and a first predetermined length and interstitial areas residing in the fabric. A SEBS like transparent polymeric material which is formed as a layer on the fabric layer and penetrating the interstitial areas in a manner to substantially remove all air therefrom, and has a second predetermined width substantially commensurate with the first width and a second predetermined length substantially commensurate with the first length which is compressed and consolidated bonded to the ink graphic layer to form a substantially uniform laminate configuration and retain a transparent and elastic cushion characteristic through the exterior polymeric film layer enabling resolution and clarity of the image, wherein the exterior polymeric film layer imparts a nonslip tactile surface to the laminate.

By way of example, the laminate material of present invention can be employed as part of a grip or handle used on a sport product such as a golf club, hockey stick, racquet, fishing rod, baseball or softball bat, or bicycle, for example. It may also be part of a grip on a tool such as a hammer, or screwdriver, or handle of a firearm, such as a pistol or rifle. It is contemplated that the laminate material may form part of a gripping surface of any object where brand identification would be visible, and where grip traction, or high friction, or grip comfort are desirable. The invention may also provide a gripping surface to a floor, seat, surfboard, paddle board, glove, or footwear.

The invention improves on prior printed microporous films applied to a molded product. Here, the instant invention provides a gripping feature such as a polymer film that will improve the gripping performance of the product. Grip performance is characterized to be tactile, non-slip, and comfortable.

The invention also enables the creation of tactile feel tailored to a predetermined hardness. In general a tactile feel is of personal preference to one's skin. For example, the laminate surface can be about the same hardness and friction as skin. This requires a polymer that provides similar characteristics to skin in the general range of 20 Shore A to 50 Shore A, preferably in the range of 30 Shore A to 40 Shore A.

Additionally, the outer layer can be provided with a textured surface to lend a cushioning effect to the laminate. One or both sides can include this textured surface.

The thickness of the polymer film can vary depending on the desired tactile feel. Film thicknesses ranging from 0.001 inches to 0.125 inches and can achieve a wide range of tactile feel. The preferred range is between 0.010-0.040 inches in thickness.

The comfort of the grip may be important in various applications. Comfort is determined by film thickness, hardness, and texture. In general the thicker the film, and the lower the hardness, the greater the comfort. The surface texture of the film has a significant effect on comfort and traction. The surface texture can have peaks and valleys to provide the desired feel. The range of peak to valley texture can vary from 0.001 inches to 0.040 inches. The spacing of the texture is also a variable, with texture very small classified as microtexture, with peak to peak (or valley to valley) spacing as little as 0.001 inches. Alternatively, peak to peak spacing can be very wide as large as 0.25 inches.

The shape of the texture will also effect feel, comfort, and traction. Texture may be rounded or smooth, creating more comfort. Texture may be jagged and rough, to offer greater bite, for example, for handles used with gloves.

The traction of a grip is measured by the friction, or the force required to slide the hand on the surface of the grip. There exist a variety of polymers with different coefficients of friction (COF). In general it is desired to have a polymer with a high COF. The polymer film may be thermoplastic or thermoset.

The clarity or transparency of the polymer film is important in order to show the printed images under the film. In general thermoplastic polymers or elastomers are preferred because they are more transparent. There exist several thermoplastic elastomers such as polyurethane and thermoset elastomers that provide the desired combination of durometer, tactile feel, high friction, and transparency.

Applying the exterior film to the printed fabric may preferably be done in a continuous process such as extrusion, laminating, and rolling. This can be a laminating process to compress and consolidate the exterior film and printed film. This is a highly controlled process with precise machinery to control the pressure, film thickness, and eliminate any air between the exterior film and printed fabric. An adhering agent can be provided promoting bonding between the between the exterior film and printed fabric, such as adhesive layer, bonding agent, or primer.

The printed film with the exterior fabric is called the preform. The exterior film may or may not have a texture. The preform may be laminated with a foam or nonwoven backing to create a laminate that in one use may be cut to form a grip strip that is wrapped around a handle.

Alternatively, the preform can be prepared for subsequent molding operation will vary depending on the geometry of the product. For a grip product, it will likely be circular or tubular. The preform is in sheet form. The preform can be die cut to the desired shape so when rolled or applied on a tube, for example, it approximates the cavity of the injection mold. The preform can be mended together at end joints by tape, adhesive, stitching, or other suitable means. In some applications the preform is not fused together to allow the preform to expand freely and conform to the injection mold cavity. In other applications the preform may not cover full circumference of the desired product geometry. The preform may envelope the article to which it attaches, or cover a partial revolution, such as 270 degrees, or 180 degrees, or 90 degrees or less.

In one contemplated embodiment, the preform can be placed in an injection mold and the mold is closed. The elastomer is injected on the interior side of the preform which creates internal pressure and forces the preform to the cavity geometry. Once the elastomer fills the cavity and presses the preform to the cavity walls, the injection of the elastomer is stopped. The mold is cooled and the product is removed from the injection mold.

An alternative method of applying a high resolution printed and coated image to a product is forming the preform to a previously molded part. This method involves placing the preform over the molded part and applying exterior pressure to fix the preform to the molded part. Heat may be applied to facilitate forming the laminate to the contour of the molded part.

Another alternative is to use a preform that is elastic and allows some stretch. For example using a polyester fabric with lycra elastic fibers, or a knit fabric with stretch properties. This will give the fabric some stretch to conform to different geometries. The preform may be formed into a tube using stitching. The preform may be slightly undersized compared to the substrate. The substrate may have an adhesive applied would act as a lubricant during installation and later dry and cure.

The product created using this technology will have a high resolution image on the exterior of the part. That image may be photographic quality showing any image that may be printed by flexographic or digital methods. An exterior film shall be applied over the printed image on the fabric to provide a tactile feel. The exterior film may have a texture formed to enhance the friction or gripping power of the exterior surface. The texture may be within the thickness of the exterior film or transfer to the printed film. An exterior texture that is formed by a deformed printed film is capable of greater texture depth, as defined by the peak to valley dimension. The exterior film may be offered in range of hardness, from a Shore A 20 to a harder Shore A 80. The texture may range from small undulations of smooth contour to large undulations of sharp radii of peaks and valleys. The laminate may need have a film on both sides of the fabric layer. The film layer serving as the under layer can include a pattern design, such as honeycomb design for cushion effect.

BRIEF DESCRIPTION OF THE DRAWINGS

For a better understanding of the present invention, reference is made to the following description of an exemplary embodiment thereof, considered in conjunction with the accompanying drawings, in which:

FIG. 22 depicts the invention on a t-shirt.

FIG. 23 depicts the invention on a hat.

FIG. 24 depicts the invention on the belt.

FIG. 32 depicts as illustration of components of a laminate embodiment of the invention.

FIG. 33 depicts as illustration of a laminate embodiment of the invention.

DETAILED DESCRIPTION OF THE DRAWINGS

Figure 29:
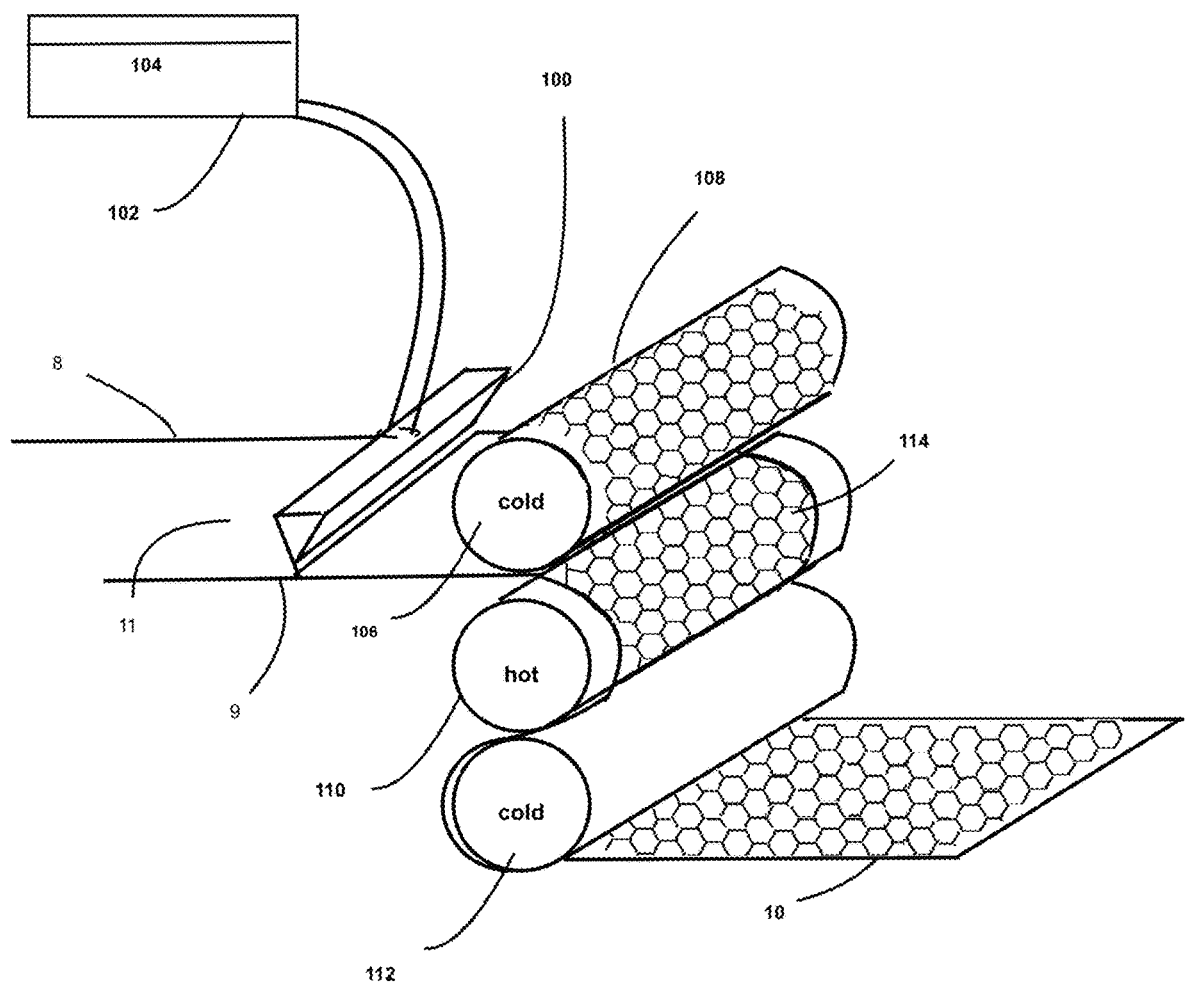
FIG. 29 depicts a process of forming the laminate of the invention.

Referring now to the drawings, the high resolution elastomeric exterior laminate material of the present invention is generally designated by the numeral 10. As can be seen in FIG. 29, a preferred forming of the laminate material 10 includes employing an extruder 100 operably connected to a hopper and feed mechanism 102. As part of a preferred embodiment in forming the laminate 10, the hopper and feed mechanism 102 can be charged with a Styrene-Ethylene-Butylene-Styrene Thermoplastic Elastomer (SEBS) or SEBS like material 104. The SEBS like material 104 provides uniquely discovered combined properties of a rubber like surface with good frictional aspects, flowability, and transparency. In connection with this a preferred embodiment of the invention there is provided a porous fabric 8 as described herein which is fed between nips of a cold roll 106 and a hot roll 110. The cold roll 106 can preferably have a textured geometric surface 108 and has a temperature (which can be cooled ambient or cooled) sufficient to impart and form a complementary geometric configuration onto an exterior surface 114 of formed laminate 10. Note, hot roll 110 is operatively disposed adjacent the cold roll 106. The hot roll 110 is kept at a sufficiently hot temperature over 325 degrees to draw the SEBS like material 104 through the porous fabric 8 sufficiently to encapsulate the porous fabric 8 while the cold roll 106 chills and forms the texture on exterior surface 114. Once the SEBS like material 104 has migrated through the porous fabric 8, there is substantially no air remaining in the laminate 10 upon reaching the cold roll 112 which is at a temperature sufficient to chill and substantially fix the SEBS like material 104. By removing the air, SEBS like material 104 and fabric 8 provides the laminate 10 with characteristics which lend extremely good clarity in addition to high resolution and permits some stretch in the laminate 10 to occur while so retaining these characteristics. The high resolution elastomeric exterior laminate material 10 in one example can be incorporated into 3 dimensional product such as a tubular product. It is further contemplated that additional texture forming can take place on a back side 9. This can be done by adding a texture to roll 110. The invention enables the above described thermoplastic to be liquified by heating it to desired temperatures and then compress it into a high temperature resistant printed fiber, e.g., polyester, which is forced it through the fabric 8. The invention in one embodiment extrudes SEBS like thermoplastic material 104 as a liquid and nip it into the printed substrate 8 at 350 pounds of force inch to inch from top side 11 and force all of residual air out of a matrix of fiber 8 and generate a textured top side 11 and a textured bottom cylinder texture provided on the bottom side 9. By forcing the forcing air out, there is generated a new dynamic laminate 10 having a textured top side 11 and bottom side 9 wherein air has been displaced trapping the high strength printed fabric between the side 9 and 11. It was discovered that the laminate was made possible by melting the SEBS like thermoplastic 104 to the top side 11 of the fabric 8 under pressure wherein all the molten material was forced from the top side 11 to the bottom side 9. Air was flushed through the fabric 8 to form an encapsulated fabric laminate 10 which is substantially free of air. This then allows for all the physical properties of the SEBS like material 104 to be "significantly enhanced" by the strength of the high performance polyester printer fabric 8. Also, the printed fabric 8 is now completely protected by the SEBS like thermoplastic 104. The SEBS like material 104 enables itself and surfaces that it contacts thus cam be integrated into a variety of products which requires no adhesive and which provides encapsulated printed fabric with outstanding performance and durability. The laminate 10 is washable and reusable.

Of particular preference is to use the high resolution elastomeric exterior laminate material 10 in products, such as sporting goods, or other products such as bottles and containers, where imagery, branding, and grip security are desired. In one preferred embodiment, the invention lends itself to an in-mold labeling process wherein a preconfigured laminate material 10. A particular advantage of the instant invention is that the SEBS like laminate material 104 which migrates toward a back side 9 of fabric 8 and protects the exterior top surface 11 whicle permitting a means of cross link bonding to a thermoplastic container structure, such as a bottle 300, wherein the laminate 10 becomes an integral part of the bottle 300 providing not only a texture through exterior surface in top side 11 for enhanced grip, and also is provided with a graphic surface on top side 11 of fabric 8. While the bottle 300 need not comprise a translucent material, in the case where the bottle 300 is made of a translucent composition, for example a blend of polypropylene and a thermoplastic resin, this configuration also provides a bottle 300 with excellent clarity of an image on top side 11 and laminate 10 can have a blank (e.g., white) surface on back side 9 which serves a function of enabling a viewer to see clearly a color of a liquid contained therein when viewing through a transparent portion 302 of the bottle 300. It is also contemplated the container structure an include a computer housing, such as that of a laptop.

Sport product handles include but are not limited to golf grips, racquet grips, paddle grips, hockey grips, fishing rod grips, bat grips, bicycle grips, weight lifting bar, computer housings and others. The invention may be applied to other products such as tool grips, firearm grips, bow grips, can holders, vehicle and boat decks and floor mats, and other applications.

Figure 1A:
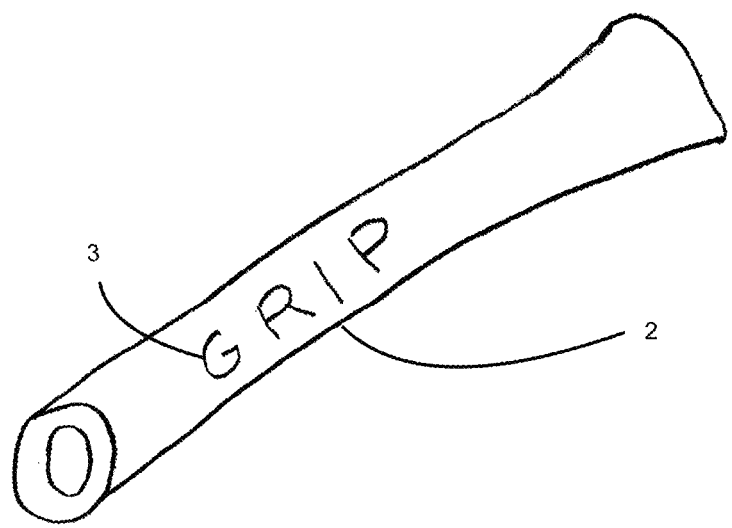
FIG. 1A is an isometric view of a conventional tubular grip.

FIG. 1 shows an isometric view of a prior art conventional tubular grip 2. The grip 2 is an injection molded or compression molded product. The grip 2 may be elastomeric, and may be thermoplastic or thermoset. The grip 2 may be a single material homogeneous through the thickness of the product. The grip 2 may also be multi-layer meaning the exterior material is different than the interior material. The gripping stability is determined by the material and texture of the mold forming the grip 2. The graphics of the grip 2 are limited. Typically the grip 2 has recessed areas 3 on the exterior surface as denoted by the word "GRIP" that are painted with different colors to give the grip some visual attractiveness. This method of applying color to grip 2 is limited in resolution and color variance.

Figure 2:
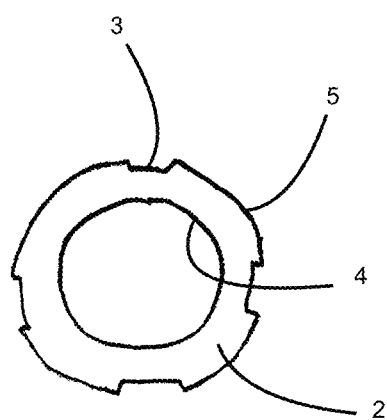
FIG. 2 is a cutaway view of a conventional tubular grip.
Figure 26:
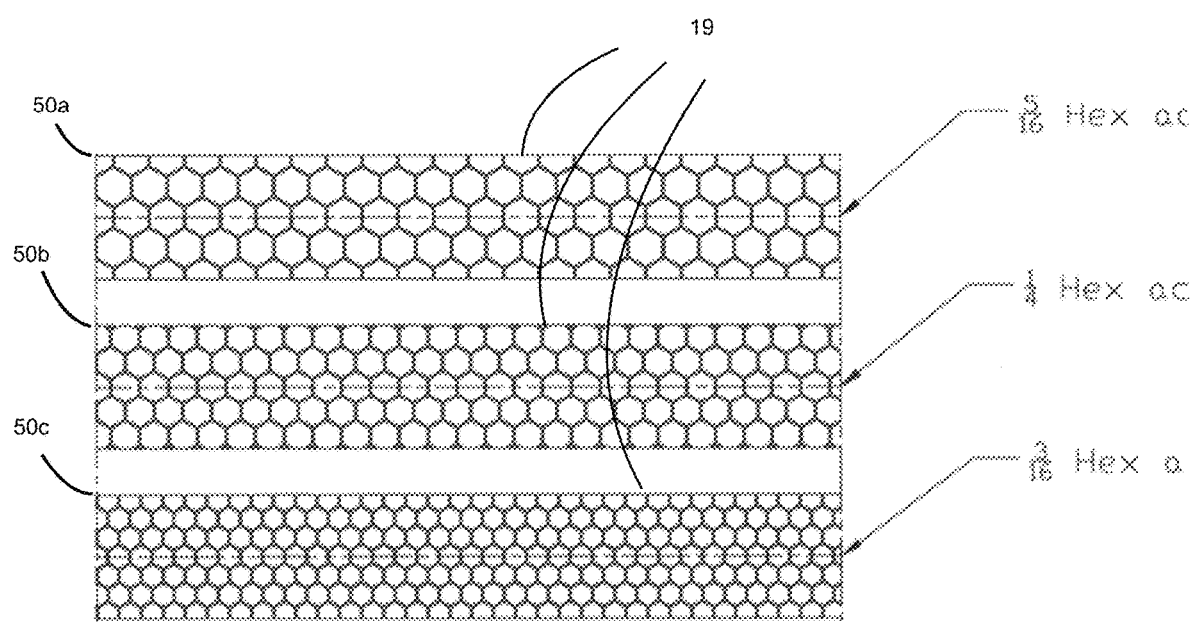
FIG. 26 depicts an exemplary outer surface and geometric pattern of part of the laminate film of the invention formed by molding.

FIG. 2 shows a sectional view of grip 2. Here, there is shown a generally circular cross-sectional shape, but could be any shape such as octagonal as used on a racquet grip, or with a flat side as used on a golf putter grip. The grip 2 has a hollow interior diameter 4 and exterior surface 5, the difference forms a wall thickness. The exterior surface 5 of the grip 2 may have texture to provide traction and desired feel as illustrated in FIG. 26, for example. FIG. 26 is a honeycomb texture used for the on an underlying film layer 17 which is illustrated with varying sized patterns. FIG. 2 shows a golf grip, with recessed areas colored which is not intended to be a focus the instant invention. The recessed areas 3 on the exterior texture may be filled with a different color paint than the body of the grip 2.

Figure 4A:
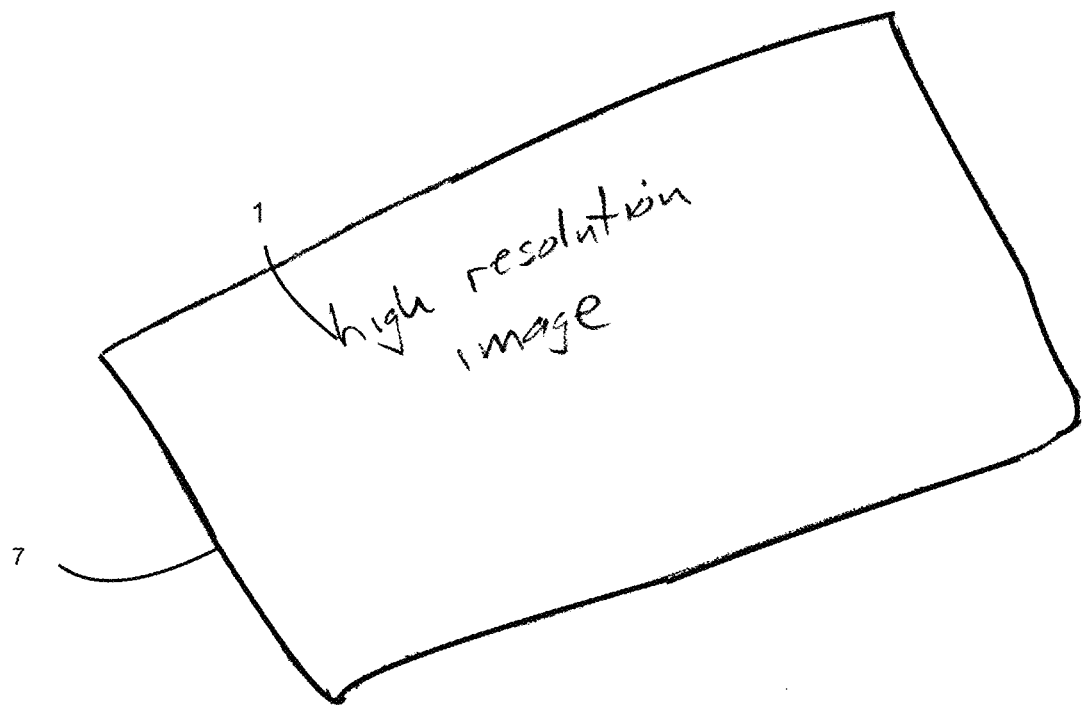
FIG. 4A is an isometric view of the printed film.

FIG. 4A depicts an isometric view of the printed film 7 that has printed on the exterior surface with a high resolution image 1, which can be any indicia, including words or an entire pictorial. An aspect of the invention is also to provide a web portal with an ability to select or create an image to be used in the printed fabric 8. In this regard, there can also be provided a QR code or another tracking indicia any of which can be characterized digital information indicia during the creation process. As is known in the art, such a site can be used to gather contact information, such as name, address and email for future contact with respect to the buyer. In one embodiment, the printed fabric 8 can include a polymer material, or can be knitted to provide desired stretch properties. In another application the print image can be applied to a blended fabric (e.g., 10% polyester 90% cotton blends, e.g., 90% polyester 10% lycra blend) wherein the ink die sublimates in polyester and is very clear and sets permanent. Printing technology has the capability of generating millions of colors in fine resolution, as much as 1800 dpi (dots per inch). Printing of the fabric can be efficient with machinery capable of printing at 60 d/minute. The particular blends provide a desired amount of stretch while retaining graphic clarity when stretched.

Of the particular importance in the instance invention is the added durability which the fabric provides in combination with a foam layer to be described hereinafter. It is believed that the closed cell structure inherently in foam typically requires a greater pound density for durability. This however is minimized through the other layers of material the instant invention rendering a relatively thin and durable material with a superior clarity and aesthetic appearance.

Figure 1B:
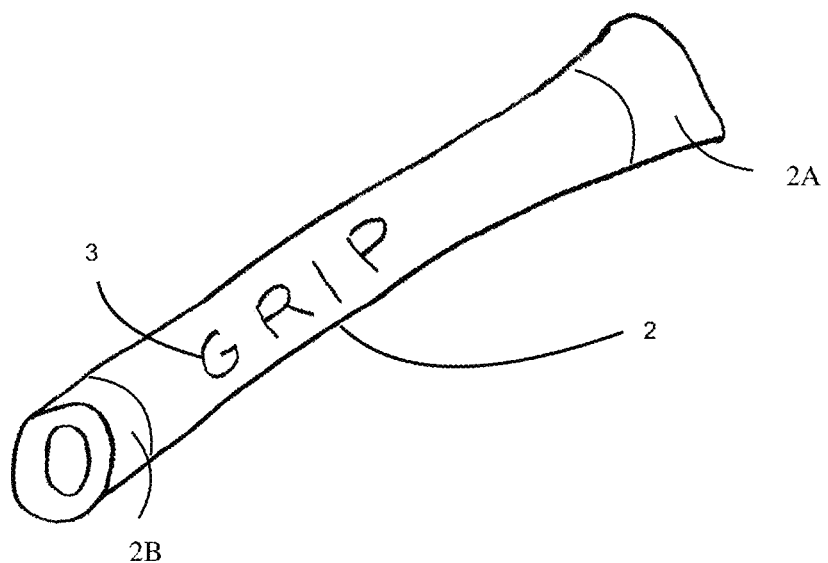
FIG. 1B is an isometric view of a tubular grip with end caps of the invention.

As illustrated in FIG. 1B, thermoformed retaining member such as a vacuum formed plastic end caps 2A and 2B can be attached to a golf grip. Caps 2A and 2B are formed from a film that have decorative characteristics, i.e., chrome, or stainless or image. The film may be any polymer capable of thermoforming. The plastic material provides protection and identification for the golf grip. Other retaining member embodiments can include an adhesive material which can be in the form of a tape or pressure sensitive adhesive backing to the laminate 10.

The film may be metallic in appearance, such as brushed metal, polished chrome, or tinted metal. The film may have a carbon fiber fabric, or any decorative appearance not possible with typical golf grip materials such as rubber and polyurethane.

The plastic is typically harder than rubber or polyurethane, protecting the grip from going in and out of the bag, or impacting other objects. The plastic film should be elastic in order to comply with the stretch of the grip upon installation, yet offer protection beyond other materials. The appearance of metal-looking caps 2A and 2B will give the golf grip 2 a unique identity.

Figure 4B:
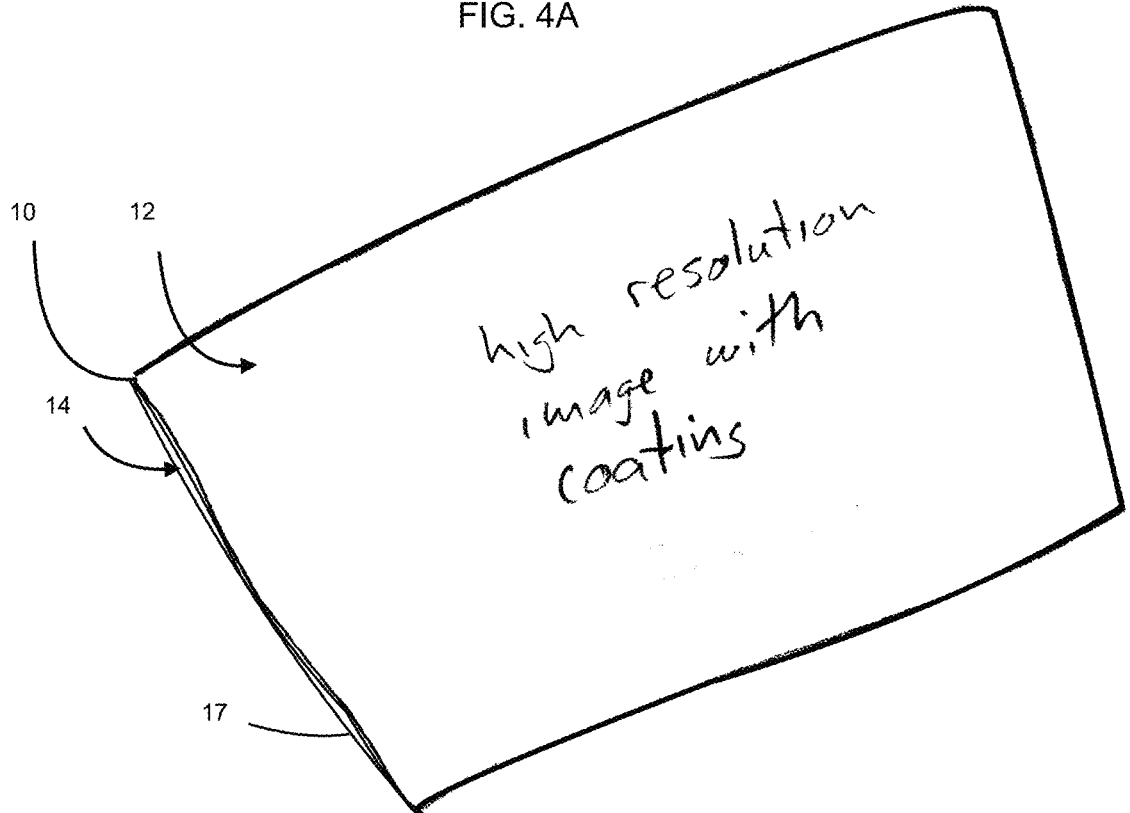
FIG. 4B is an isometric view of an exterior film laminated to the printed film.

FIG. 4B illustrates preform 10 with an exterior film 12 applied on the printed side of the underlying fabric 14. The exterior film 12 may be transparent to allow visibility of the printed image. The exterior film 12 may vary in thickness, ranging from 0.003 inches to 0.050 inches. The exterior film 12 may be tinted if desired to generate an appealing visual. The underlying fabric 14 can likewise be provided with a material similar to the exterior material for applications in providing a stand alone product, such as a coaster or can or bottle wrap. Another contemplated use of the invention is for belts and ball caps.

Figure 3:
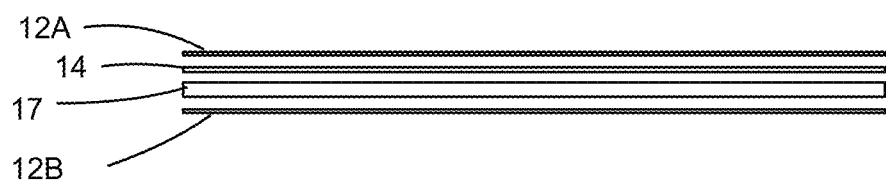
FIG. 3 is an exploded side view of the layers of an exemplary laminate of the invention.

One embodiment contemplates the underlying fabric layer 14 can have exterior film 12 formed in a predetermined geometric pattern e.g., 50a, 50b, 50c, such as a honeycomb as seen in FIG. 26, which can be of a desired size or other pattern to provide a desired feel and cushion as function of width and depth. Optionally, a foam layer 17 can also be employed for additional cushion as explained herein. FIG. 3 shows exterior layer 12A and 12B with interposed fabric layer 14 and foam layer 17. It is also contemplated that two of the layers may be used alone as part of the novelty of the invention. With the instant invention, there is provided a foam density reduction of many weight factors while maintaining equivalent durability. Thus, the invention enables a durable usage for indoor/outdoor application.

Figure 5:
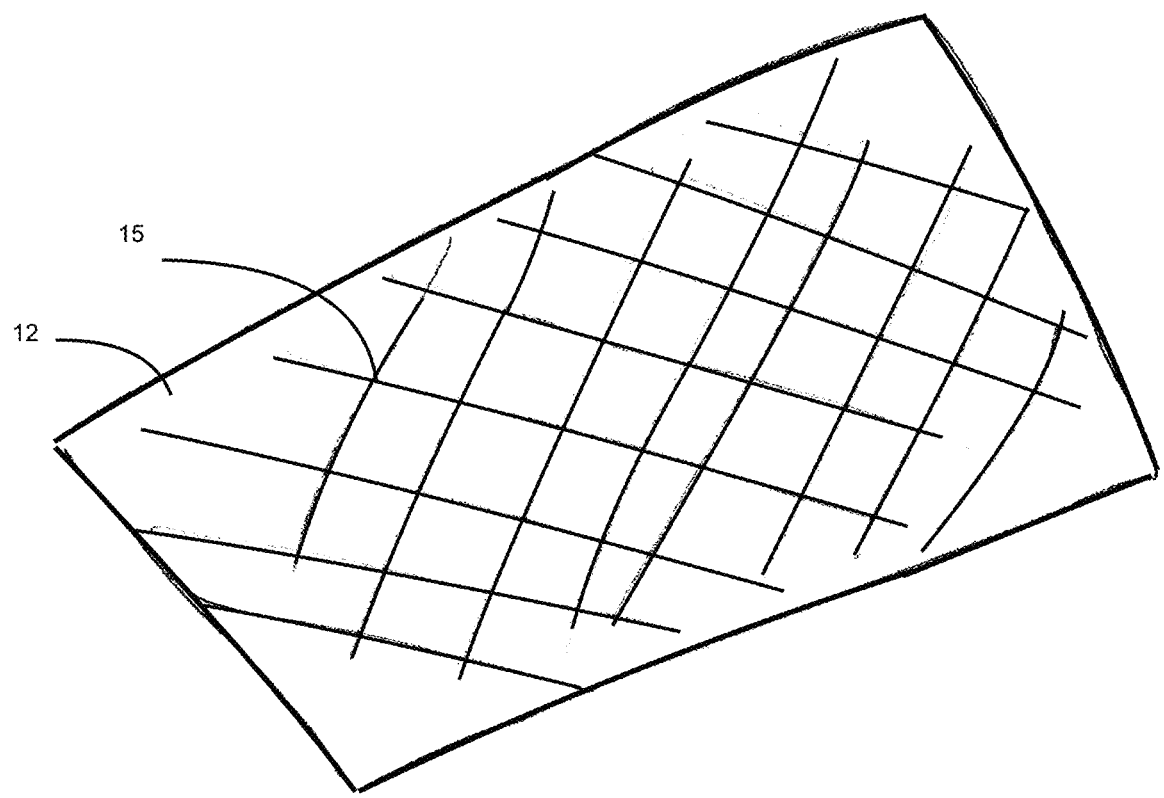
FIG. 5 is an isometric view of the laminated film with exterior texture.

FIG. 5 shows the exterior film 12 in FIG. 4 with a texture 15. The texture 15 in this example is a regular pattern of crossed grooves. The texture 15 provides enhanced traction to the exterior surface, increasing grip stability in wet or humid conditions. The texture 15 may vary from small peak to valley depths around 0.005 inches to large peak to valley depths of 0.040 inches. The spacing of the texture 15 may also vary.

Figure 6:
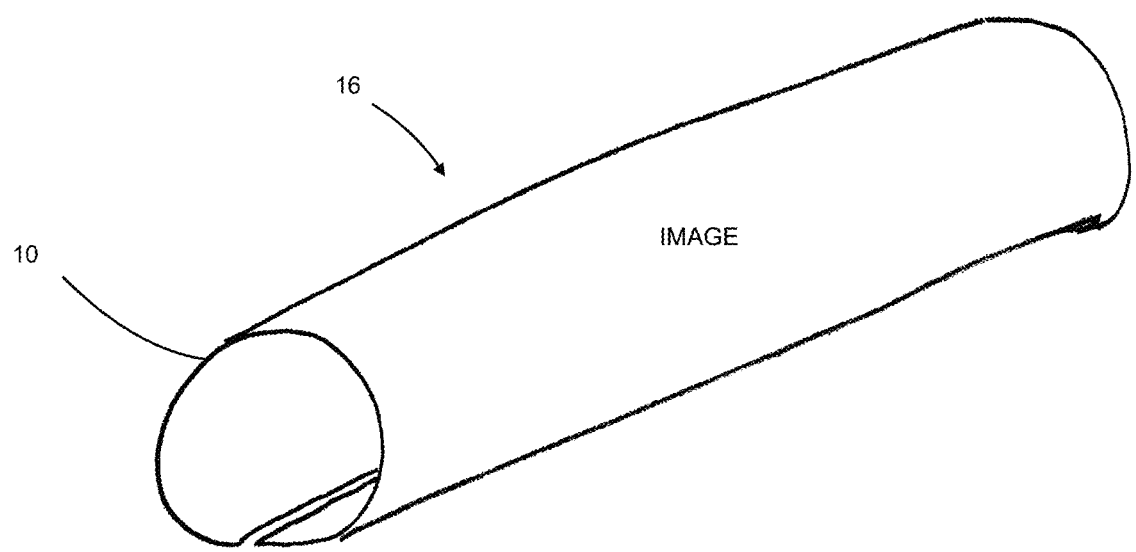
FIG. 6 is an isometric view of the laminated film formed into a preform.

FIG. 6 is an isometric view of the coated printed preform 10 formed into a tubular shape called a preform 16. The preform 16 may be of constant diameter or conical or some other tubular variance. The preform 16 edges may be adhered to retain the shape of the preform. Alternatively, the preform may be fixed with a low strength adhesive to allow it to expand during molding.

Figure 7:
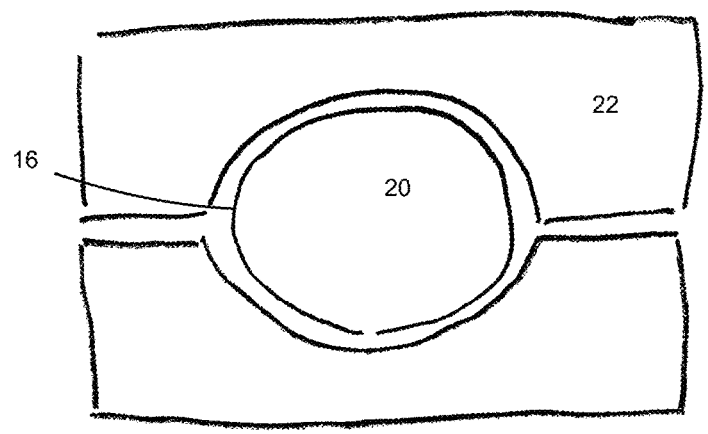
FIG. 7 shows a cutaway view of the preform placed in an injection mold cavity.

FIG. 7 is a cutaway view showing the preform 16 placed in a cavity 20 of the injection mold 22. The preform 16 may have indexing means to accurately position it in the mold so its orientation and location are controlled. The preform 16 may be held by vacuum or electrostatic charge to prevent it from moving during the injection of the material.

Figure 8:
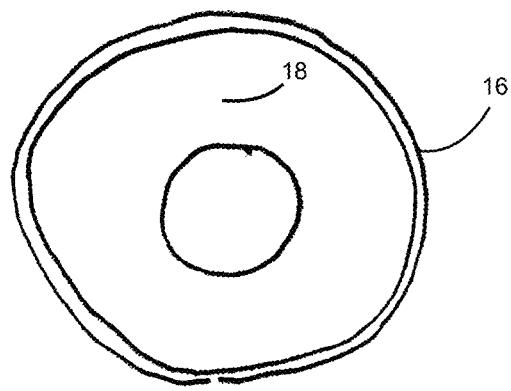
FIG. 8 shows a cutaway view of the molded part with the fused preform.

FIG. 8 is a cutaway view of the molded part showing the elastomeric body 18 of the grip and the fused preform 16 on the exterior. The preform 10 adheres to the body of the grip and is integrated. The image printed on the preform 10 is visible through the transparent exterior film. The texture of the exterior film is retained during molding.

Figure 9:
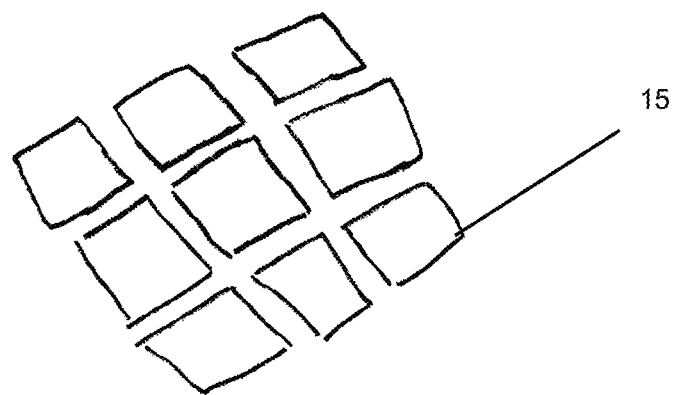
FIG. 9 shows a texture variant.

FIG. 9 illustrates a square pattern texture showing orthogonal grooves crossing.

Figure 10:
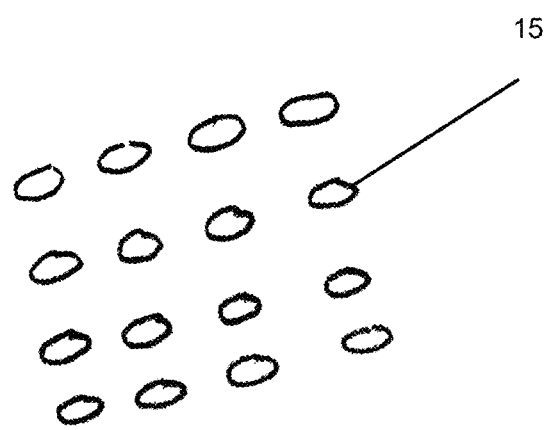
FIG. 10 shows another texture variant.

FIG. 10 illustrates a pattern of raised dots as a texture pattern.

Figure 11:
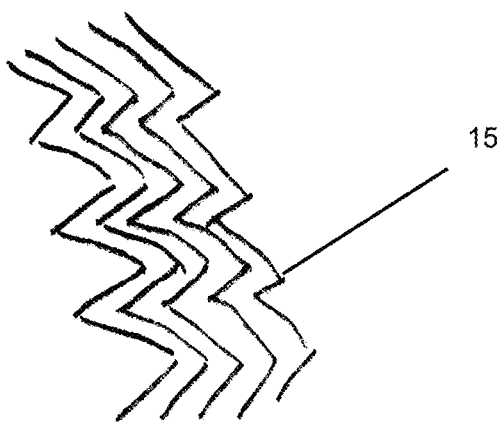
FIG. 11 shows still another texture variant.

FIG. 11 illustrates a herringbone pattern of texture.

Figure 12:
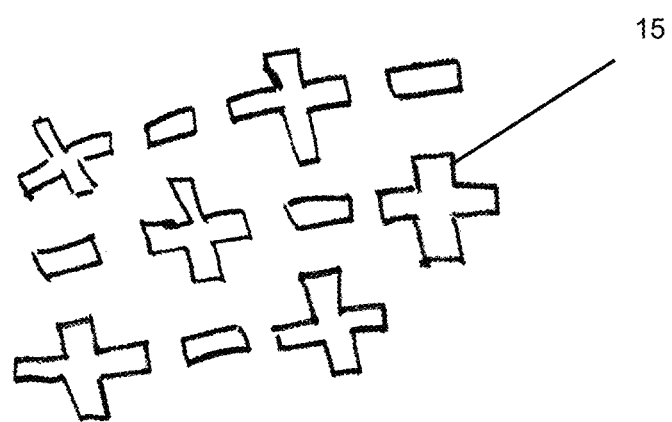
FIG. 12 shows yet another texture variant.

FIG. 12 illustrates a decorative pattern of texture. The texture pattern doesn't have to align with the graphics of the printed image. The texture pattern may be independent of graphic design.

Figure 13:
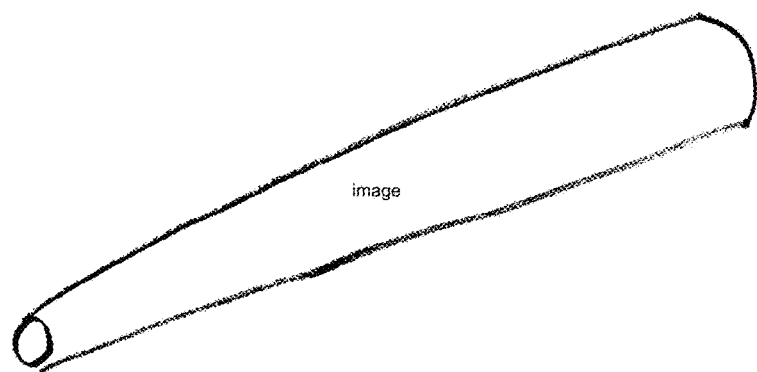
FIG. 13 shows the invention applied to a golf grip.

FIG. 13 is an isometric view of a golf grip using the invention.

Figure 14:
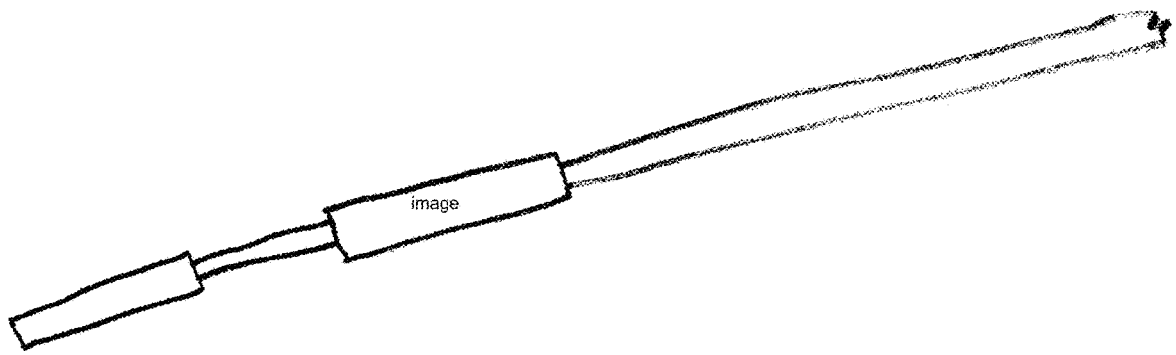
FIG. 14 shows the invention applied to a fishing rod grip.

FIG. 14 is an isometric view of a fishing road using the invention.

Figure 15:
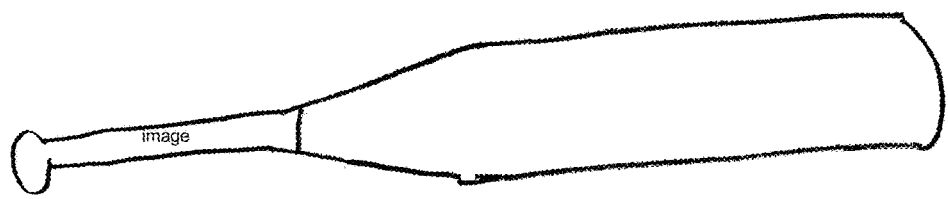
FIG. 15 shows the invention applied to a bat grip.

FIG. 15 is an isometric view of a baseball bat using the invention.

Figure 16:
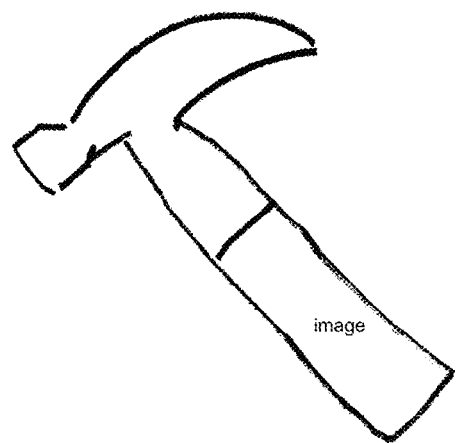
FIG. 16 shows the invention applied to a tool.

FIG. 16 is an isometric view of a hammer using the invention.

Figure 17:
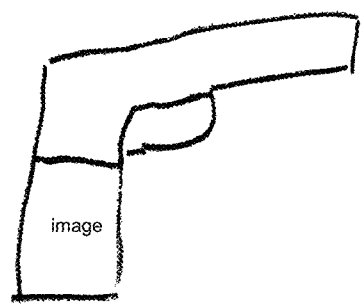
FIG. 17 shows the invention applied to a firearm.

FIG. 17 is an isometric view of a firearm using the invention.

Figure 18:
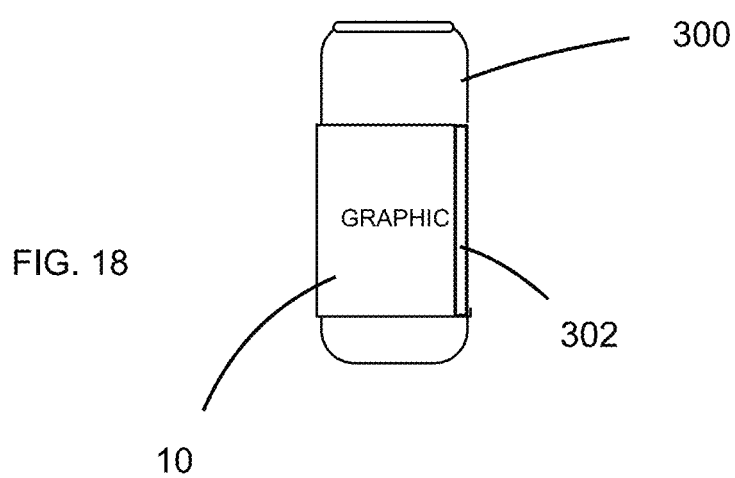
FIG. 18 shows an embodiment of the invention as a label or wrap on a bottle which can be thermally bonded thereto.

FIG. 18 is an isometric view of a label or wrap for an article, here thermoplastic bottle to which the laminate can be thermally bonded. In this regard, by virtue of the SEBS like material 104 being pushed through the fabric 8, the SEBS like material has constituents therein which permit the laminate 10 to be thermally bonded to the bottle 300. The bottle 300 could be another suitable article of material capable of thermally bonding to the laminate 10. It is also envisioned that the laminate 10 can be formed as a wrap, e.g., via stitched at its ends, to simply connect about the article by friction.

Figure 19:
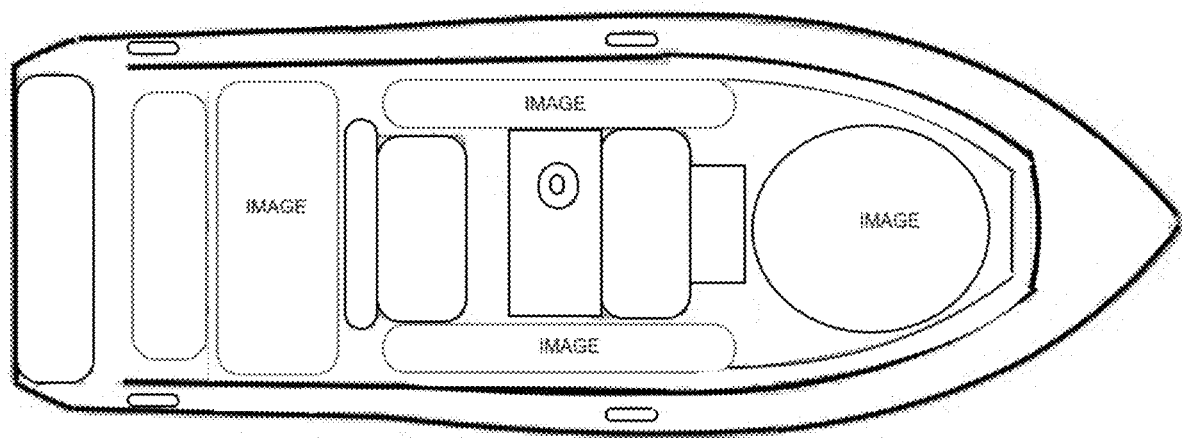
FIG. 19 is an isometric view of a boat surface having the invention deployed thereon.

FIG. 19 is an isometric view of a boat surface 110 having the invention deployed thereon. In this aspect of the invention, it may be desirable to form the laminate 10 with the SEBS like material 104 being of a mil thickness, such as 10 mil such that when formed in the process above, the SEBS like material 104 does not permeate through to back side 9. In this way, the laminate can be bonded to a deck surface 110 which uses a bonding material specific for poling the fabric material 8, e.g., polyester.

Figure 20:
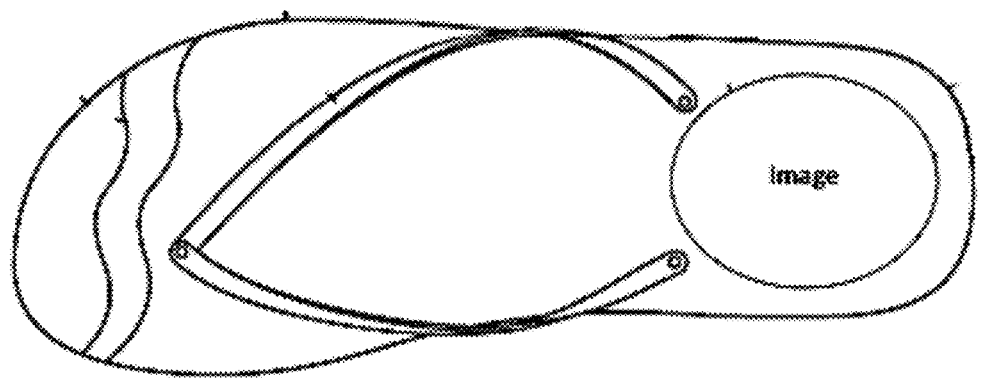
FIG. 20 depicts the invention on a sandal.
Figure 21:
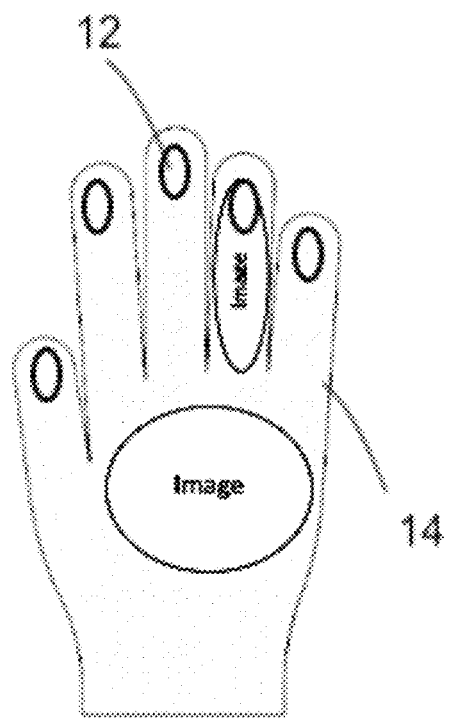
FIG. 21 depicts the invention on a glove.

FIG. 20 shows an embodiment of the invention as a sandal showing an image below a tactile, non-slip surface FIG. 21 shows an embodiment of the invention as a glove showing an image below a tactile, non-slip surface on a fabric material layer 14 with areas having thermoplastic rubber layer 12.

FIG. 22 shows an embodiment of the invention as a shirt showing an area for creating padding and non-slip for resting a firearm.

FIG. 23 shows an embodiment of the invention as a hat showing a textured image on the brim of a cap.

FIG. 24 shows and embodiment of the invention as a belt showing a textured image on the belt.

Figure 25:
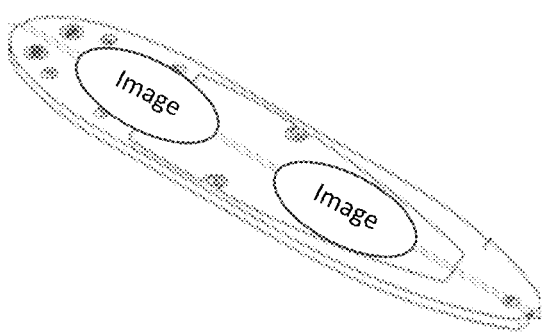
FIG. 25 depicts the invention a surf board.

FIG. 25 shows an embodiment of the invention applied to a paddleboard to create an image with a non-slip surface.

FIG. 26 shows a surface pattern configuration formed as part of the exterior surface of a laminate of the invention to lend a desired feel and cushion.

Figure 27:
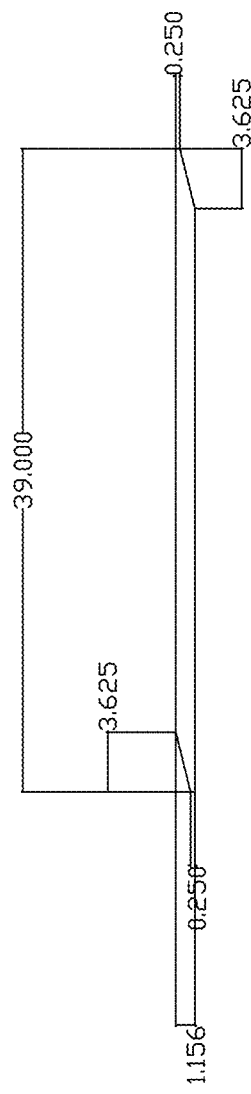
FIG. 27 depicts an application of the invention on a fishing wrap.

FIG. 27 depicts a plan view fishing rod wrap. Note, the hole is provided for a trigger finger.

Figure 28:
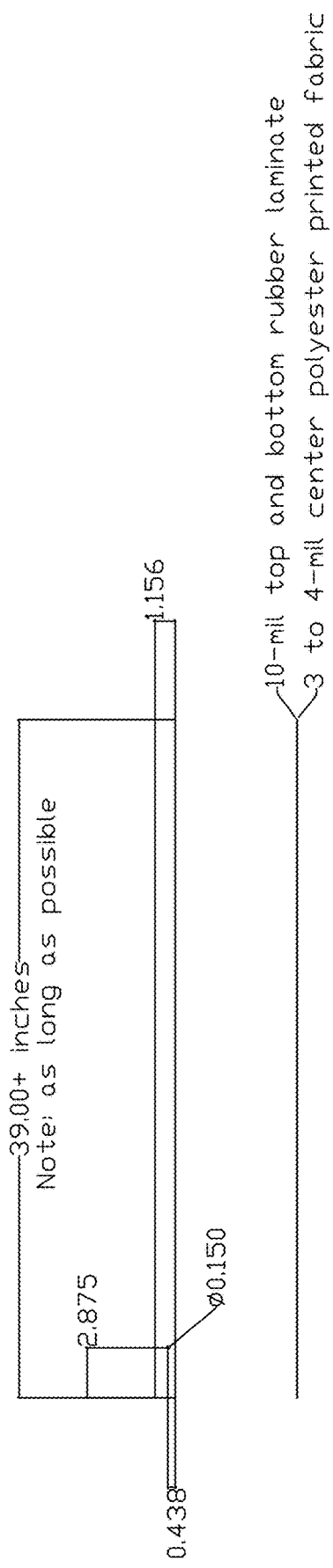
FIG. 28 depicts an application of the invention on a wrap.

FIG. 28 depicts a side view of a baseball bat wrap.

FIG. 29 depicts a process of forming the laminate of the invention.

Figure 30:
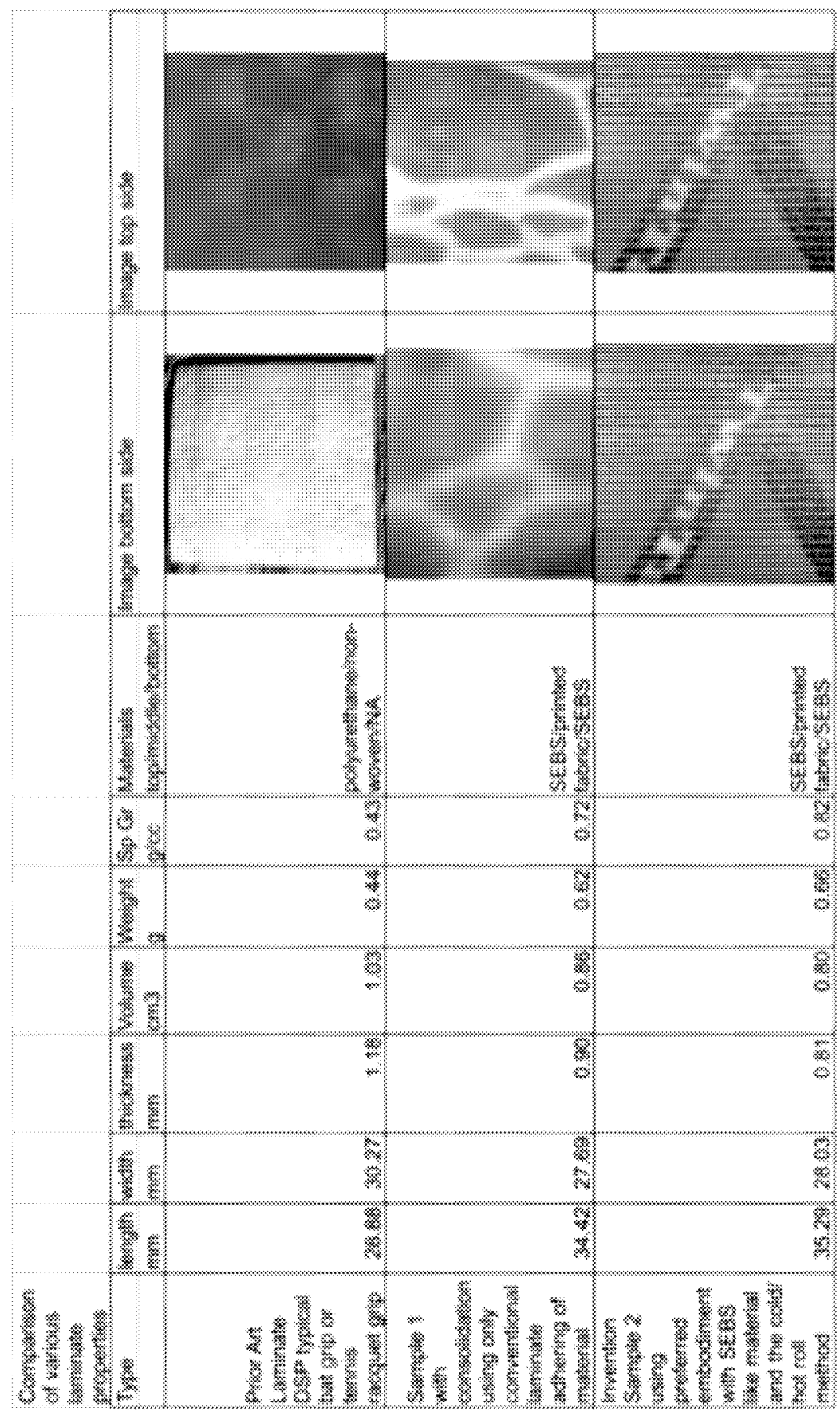
FIG. 30 is Table 1 depicting physical aspects of the invention.

FIG. 30 depicts Table 1 showing physical characteristics.

Figure 31:
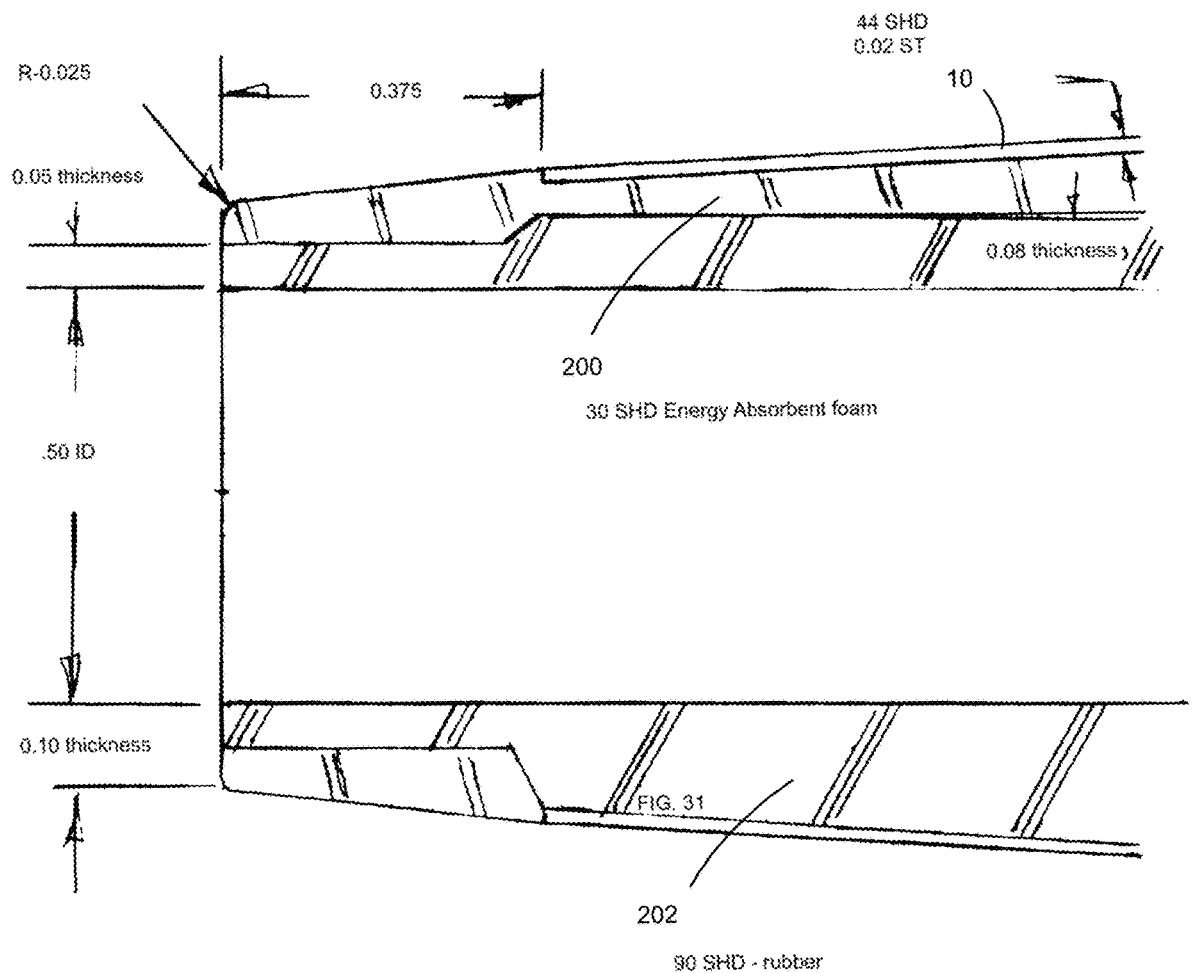
FIG. 31 shows a cross-section of an embodiment of the invention of a grip.
Figure 34:
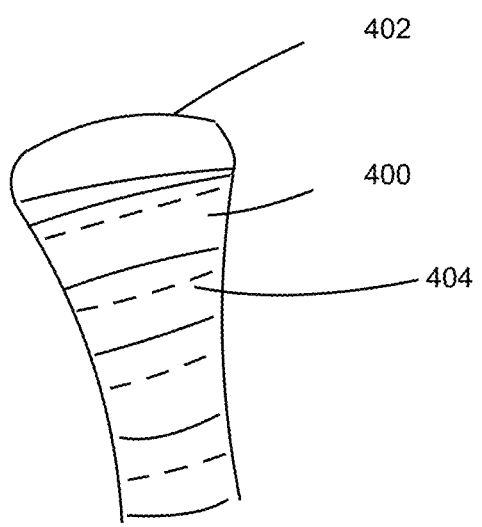
FIG. 34 depicts an embodiment of the invention used on a bat.

FIG. 31 shows a cross section of the grip 2 which includes the laminate 10 of the invention disposed as part of an exterior of the grip 2. Additionally, a unique combination of layers are provided. Middle layer 200 and inner layer 202 differ density, for example, the middle layer 200 can be of a about 22-50 shore hardness and inner layer 202 can be about 50-90 shore hardness and exterior layer comprising the laminate 10 can be of about 45-60 shore hardness. The hardness can be created by adding clay, calcium carbonate, and/or silica and a blowing agent. In this way the grip 2 can have an enhanced shock absorbing aspect. This is of significant aid to the user in decreasing joint pain and injury.

Additionally, the exterior layer 12A can include cuts or holes 204, by laser cutting for example, and/or an optional layer 13 which can include holes 206 to reveal the inner fabric layer 14. It is contemplated the fabric layer 14 can be coated with a surfactant prior to integration into the grip 2. Accordingly, once the fabric 14 is exposed, it acts as a moisture absorber to wick away moisture during use. However, the structure of the grip 2 uniquely enables the user to take a towel, whether openings are formed or not, and squeeze the grip 2 to force moisture into the towel. It is also envisioned the laminate 10 can be wrapped in a manner conventionally seen in strips on handle bars, baseball bats, golf grips, tennis racquets and the like. Further, it may be desirable to use a separate strip of cloth which serves as moisture absorber under layer and then cover the under layer with the laminate 10.

Boats and other vehicles have a need for high friction mats for traction and decoration. Using adhesive to attach the mat works except when the mat must be removed. Removal of the mat is preferred when cleaning the boat, for example cleaning up fish debris or other unpleasant muck. A mat that is adhered cannot be easily removed. If an adhesive is used, then the adhesive must be removed from both the mat and boat surface.

A mat that can have a removable attachment to the boat surface is preferred. A surface geometry that promotes cohesion or suction to attach the mat is preferred. A mat with a cohesive attachment will function as an adhered mat, yet be removable. The preferred design is to have a 3d texture with suction cup features, for example protrusions with a concave element to them coupled with a relief groove surrounding the protrusions to allow side deformation to increase suction.

The invention enables the creation of tactile feel tailored to a predetermined hardness. In general a tactile feel is of personal preference to one's skin. For example, the laminate surface can be about the same hardness and friction as skin. This requires a polymer that provides similar characteristics to skin, in the general range of 20 Shore A to 50 Shore A, preferably in the range of 30 Shore A to 40 Shore A, but it is contemplated that higher durometer can be employed for specific application.

The thickness of each polymer film can vary depending on the desired tactile feel. Film thicknesses ranging from 0.001 inches to 0.125 inches and can achieve a wide range of tactile feel. The preferred range is between 0.010-0.040 inches in thickness.

The comfort of the grip may be important in various applications. Comfort is determined by film thickness, hardness, and texture. In general the thicker the film 12, and the lower the hardness, the greater the comfort. The surface texture 15 of the film 12 has a significant effect on comfort and traction. The surface texture 15 can have peaks and valleys to provide the desired feel. The range of peak to valley texture can vary from 0.001 inches to 0.040 inches. The spacing of the texture is also a variable, with texture very small classified as microtexture, with peak to peak (or valley to valley) spacing as little as 0.001 inches. Alternatively, peak to peak spacing can be very wide as large as 0.25 inches.

The shape of the texture 15 will also effect feel, comfort, and traction. Texture 15 may be rounded or smooth, creating more comfort. Texture 15 may be jagged and rough, to offer greater bite, for example, for handles used with gloves.

The traction of a grip is measured by the friction, or the force required to slide the hand on the surface of the grip. There exist a variety of polymers with different coefficients of friction (COF). In general it is desired to have a polymer with a high COF. The exterior film 12 may be thermoplastic or thermoset. The exterior film 12 will have a hydrophobic property for high traction when wet or dry The clarity or transparency of the exterior film 12 is important in order to show the printed images under the film. In general thermoplastic polymers or elastomers are preferred because they are more transparent. There exist several thermoplastic elastomers such as polyurethane and polymer material that provide the desired combination of durometer, tactile feel, high friction, and transparency.

Applying the exterior film 12 to the printed fabric 14 may be done via laminating or in a continuous process such as molding, extrusion and/or rolling. This can be a laminating process to compress and consolidate the exterior film 12 and printed fabric 14. This is a highly controlled process with precise machinery to control the pressure, film thickness, and eliminate any air between the exterior film 12 and printed fabric 14. An adhering agent can be provided promoting bonding between the between the exterior film 12 and printed fabric 14, such as adhesive layer, bonding agent, or primer The printed fabric 14 with the exterior film 12 is coined "preform" 16 as it is in a useful shape for its intended application, e.g., a golf grip. The exterior film 12 may or may not have a texture. The preform 16 may be laminated with a foam or nonwoven backing to create a laminate that in one use may be cut to form a grip strip 400 that is wrapped around a handle as seen in FIG. 33. By virtue of the novelty of the instant inventive combination, the stip grip 400 can be stretched around the arcuate portion of the bat 402 and conforms to the arcuate surface all the while maintaining all the features of the invention in terms of its improved grip, strength, and image clarity. This is unique to the instant invention.

That polymer foam could be polyurethane, polyethylene, polystyrene, EVA, neoprene, etc. Some applications, the foam may be any thickness, between 0.010"-0.250". For example, for grips it will be between 0.020"-0.080". For mats, it will be between 0.100"-0.50". The foam may vary in density, cell size, etc to provide the desired cushion.

The foam may be attached to the laminate using adhesive. A film adhesive can be fixed to the laminate with pressure and heat from a press or laminating machine. It can also be attached using induction heating, where the film is impregnated with conductive material and only the film is heated as pressure is applied by a press or laminating machine. The induction heating has the advantage of reducing foam cell compression because only the film is heated.

The foam may be adhered without any film adhesive. Heat can be applied at the interface during a lamination process. The heat zone needs to be closely controlled so only the interface of the materials being bonded is heated to achieve polymer softening, flow, and bonding. The polymer content of the foam and laminate must be compatible for this process to achieve adhesion.

It may be desirable to have more than one layer of foam, for example, a more dense foam on either the top or bottom side of a less dense foam. These foams may be laminated by either of the above mentioned processes (heat or induction). The multilayer foam laminate could be laminated before laminating to the laminate, or everything can be laminated together. A multilayer foam laminate using one or more features of the invention is contemplated.

Alternatively, the preform 16 is prepared for subsequent molding operation will vary depending on the geometry of the product. For a grip product, it will likely be circular or tubular. The preform 16 can be in sheet form. The preform 16 can be die cut to the desired shape so when rolled or applied on a tube, for example, it approximates the cavity 20 of the injection mold 22. The preform 16 can be mended together at end joints by tape, adhesive, stitching, or other suitable means. In some applications the preform is not fused together to allow the preform to expand freely and conform to the injection mold cavity. In other applications the preform 16 may not cover full circumference of the desired product geometry. The preform 16 may envelope the article to which it attaches, or cover a partial revolution, such as 270 degrees, or 180 degrees, or 90 degrees or less.

In one contemplated embodiment, the preform 16 can be placed in an injection mold 22 and the mold 22 is closed. Elastomer 18 is injected on the interior side of the preform 16 which creates internal pressure and forces the preform to the cavity geometry. Once the elastomer 18 fills the cavity and presses the preform 16 to the cavity walls, the injection of the elastomer 18 is stopped. The mold 22 is cooled and the product is removed from the injection mold 22.

An alternative method of applying a high resolution printed and coated image to a product is forming the preform 16 to a previously formed article. This method involves placing the preform 16 over the molded part and applying exterior pressure to fix the preform 16 to the molded part. In desired applications, heat can be applied to facilitate forming the microporous film to the contour of the molded part.

In another embodiment, the preform 16 can be provided on the outer surface to create a mat surface which can be laid onto a surface such as a deck thereby imparting a visually aesthetically pleasing image with an anti-slip surface and drawings herewith are illustrative of uses of the embodiments.

The products created using this technology will have a high resolution image on the exterior of the part. That image may be photographic quality showing any image that may be printed by flexographic or digital methods. An exterior film shall be applied over the printed image to provide a tactile feel. The exterior film may have a texture formed to enhance the friction or gripping power of the exterior surface. The texture may be within the thickness of the exterior film or transfer to the printed film. An exterior texture that is formed is provided by a deformed film is capable of greater texture depth, as defined by the peak to valley dimension. The exterior film may be offered in range of hardness, from a soft Shore A 20 to a harder Shore A 90. The texture may range from small undulations of smooth contour to large undulations of sharp radii of peaks and valleys. Additionally, there can be provided a variability of texture and depth.

An example of the improvements provided by the invention can be seen in the comparative results in the table below. There is a clear visible resolution difference which is achieved which is observed from the displacement of the air by the externally applied material, particularly the instant invention which substantially occupies interstitial areas between the fibers of fabric, and evidenced by the difference in the specific gravities achieved in the products. See Table 1 FIG. 30.

Another contemplated use of the invention can be for mats and mud flaps with decorative layer. Printed fabric attached to polymer mud flaps to add some decoration. Mud flaps are typically made from compressed, or injected, or extruded rubber or other polymeric or elastic materials. There is a need to decorate mud flaps with a logo or other information. That artwork is typically screen printed or hot stamped. Any conventional method is limited to the detail of the graphic, number of colors, etc.

The concept of printing a high resolution image on a fabric, and applying the printed fabric to the mud flap will create a decorated mud flap with superior graphics. Digital printed artwork is capable of millions of colors and resolutions up to 1800 dpi. The proposed method would be print the graphic on a polyester fabric. That printed fabric may or may not receive a protective clear coat.

The coated printed fabric may be co-molded with the mud flap when it is molded or extruded. Alternatively, the coated printed fabric may be bonded to the mud flap.

A product with enhanced gripping means combined with high resolution imagery is unique and desirable. The imagery may have numerous colors including neons, metals, chromes, and flakes. The exterior surface of the product may have a range of hardness and texture. The printed images may resist UV and Ozone better than existing thermoplastics and thermosets. The texture of the exterior film is independent of the printed image, providing design flexibility and enhanced product performance. Numerous products may be enhanced with the present invention.

It will be understood that the embodiment of the present invention assembly and method that have been illustrated are merely exemplary and that a person skilled in the art can make variations to the shown embodiment without departing from the intended scope of the invention. All such variations, modifications and alternate embodiments are intended to be included within the scope of the present invention as defined by the claims.

What is claimed is:

1. An elastomeric laminate material having resolution and image clarity, which includes:
    an underlying synthetic porous fabric substrate including a stretchable porous fabric with stretchable fibers having interstitial areas, which includes an ink transferred into said stretchable fibers rendering an ink graphic image in said underlying synthetic porous fabric substrate, while maintaining porosity in said interstitial areas such that said underlying synthetic porous fabric substrate is receptive to receive an elastomer material about and through said underlying synthetic porous fabric substrate and said interstitial areas; and
    a transparent elastomer polymeric material comprising SEBS which is formed as a layer on and about said underlying synthetic porous fabric substrate having said ink graphic image, said transparent elastomer polymeric material penetrating said interstitial areas in a manner to remove and displace air therefrom in an amount to encapsulate said underlying synthetic porous fabric substrate and enable enhanced resolution and clarity of said ink graphic image by virtue of displacing air in said interstitial areas, and bonded to said underlying synthetic porous fabric substrate having said ink graphic image therein to form a substantially uniform laminate configuration, providing said elastomeric laminate material which retains transparency and elasticity and enabling resolution and clarity of said ink graphic image, wherein said transparent elastomer polymeric material layer provides a nonslip tactile surface, said elastomeric laminate material having a specific gravity of at least 0.5.

2. The elastomeric laminate material having resolution and image clarity of claim 1, wherein said transparent elastomer polymeric material has a thickness in the range from 0.001 inches to 0.125 inches.

3. The elastomeric laminate material having resolution and image clarity of claim 1, wherein said elastomeric laminate material is provided in the form of a grip surface on one of a container, a golf club, a hockey stick, a racquet, a fishing rod, a bicycle handle, a floor, a boat deck, a tool, a firearm, an article of clothing, or a bat.

4. The elastomeric laminate material having resolution and image clarity of claim 1, wherein said ink graphic fabric layer includes one of polyester, cotton, rayon, or nylon which permits said ink graphic fabric layer to be stretched to conform to a multi-dimensional product configuration and retain image clarity.

5. The elastomeric laminate material having resolution and image clarity of claim 1, wherein said transparent elastomer polymeric material includes a surface texture formed thereon, wherein said surface texture has peaks and valleys, and wherein a range of peak-to-valley is from 0.001 inches to 0.040 inches.

6. The elastomeric laminate material having resolution and image clarity of claim 1, wherein said transparent elastomer polymeric material has a hardness in a range of 20 Shore A to 90 Shore A.

7. The elastomeric laminate material having resolution and image clarity of claim 1, which further includes said ink graphic fabric layer sandwiched between said transparent elastomer polymeric material and another layer made of one of a polymeric film, a polyfoam, a woven and a non-woven material.

8. The elastomeric laminate material having resolution and image clarity of claim 1, wherein said layer of said transparent elastomer polymeric material includes a predetermined geometric pattern which is of a size and shape to lend cushion to said high resolution elastomeric exterior laminate material.

9. The elastomeric laminate material having resolution and image clarity of claim 3, which further includes a retaining member configured to retain said elastomeric laminate material on one of said container, said golf club, said hockey stick, said racquet, said fishing rod, said bicycle handle, said tool, said firearm, and said bat.

10. An elastomeric laminate material having high resolution and image clarity, which includes:
    an underlying synthetic porous fabric substrate including a stretchable porous fabric with stretchable fibers having interstitial areas, which includes an ink transferred into said stretchable fibers rendering an ink graphic image in said underlying synthetic porous fabric substrate, while maintaining porosity in said interstitial areas such that said underlying synthetic porous fabric substrate is receptive to receive an elastomer material about and through said underlying synthetic porous fabric substrate and said interstitial areas; and
    a transparent elastomer-polymeric material comprising SEBS characteristics which is formed as a layer on and about said underlying synthetic porous fabric substrate having said ink graphic image, said transparent elastomer-polymeric material penetrating said interstitial areas in a manner to remove and displace air therefrom in an amount to encapsulate said underlying synthetic porous fabric substrate and enable enhanced resolution and clarity of said ink graphic image by virtue of displacing air in said interstitial areas, and bonded to said underlying synthetic porous fabric substrate having said ink graphic image therein to form a substantially uniform laminate configuration, providing said elastomeric laminate material which retains transparency and elasticity and enabling resolution and clarity of said ink graphic image, wherein said transparent elastomer polymeric material layer provides a nonslip tactile surface, said elastomeric laminate material having a specific gravity of at least 0.5.

11. The elastomeric laminate material having high resolution and image clarity of claim 10, wherein said transparent elastomer polymeric material has a thickness in the range from 0.001 inches to 0.125 inches.

12. The elastomeric laminate material having high resolution and image clarity of claim 10, wherein said elastomeric laminate material is provided in the form of a grip surface on one of a container, a golf club, a hockey stick, a racquet, a fishing rod, a bicycle handle, a floor, a boat deck, a tool, a firearm, an article of clothing, or a bat.

13. The elastomeric laminate material having high resolution and image clarity of claim 10, wherein said ink graphic fabric layer includes one of polyester, cotton, rayon, or nylon which permits said ink graphic fabric layer to be stretched to conform to a multi-dimensional product configuration and retain image clarity.

14. The elastomeric laminate material having high resolution and image clarity of claim 10, wherein said transparent elastomer polymeric material includes a surface texture formed thereon, wherein said surface texture has peaks and valleys, and wherein a range of peak-to-valley is from 0.001 inches to 0.040 inches.

15. The elastomeric laminate material having resolution and image clarity of claim 10, wherein said transparent elastomer polymeric material has a hardness in a range of 20 Shore A to 90 Shore A.

16. The elastomeric laminate material having resolution and image clarity of claim 10, which further includes said ink graphic fabric layer sandwiched between said transparent elastomer polymeric material and another layer made of one of a polymeric film, a polyfoam, a woven and a non-woven material.

17. The elastomeric laminate material having resolution and image clarity of claim 10, wherein said layer of said transparent elastomer polymeric material includes a predetermined geometric pattern which is of a size and shape to lend cushion to said high resolution elastomeric laminate material.

18. The elastomeric laminate material having resolution and image clarity of claim 12, which further includes a retaining member configured to retain said elastomeric laminate material on one of said container, said golf club, said hockey stick, said racquet, said fishing rod, said bicycle handle, said tool, said firearm, and said bat.

* * * * *